US008657949B2

(12) United States Patent
Negri et al.

(10) Patent No.: US 8,657,949 B2
(45) Date of Patent: Feb. 25, 2014

(54) DECORATIVE EFFECT COATING COMPOSITIONS AND METHODS OF MAKING AND APPLYING SAME

(75) Inventors: Robert H. Negri, Lake Villa, IL (US); Rafael Bury, Wheeling, IL (US)

(73) Assignee: United States Gypsum Company, Chicago, IL (US)

( * ) Notice: Subject to any disclaimer, the term of this patent is extended or adjusted under 35 U.S.C. 154(b) by 1139 days.

(21) Appl. No.: 11/287,036

(22) Filed: Nov. 22, 2005

(65) Prior Publication Data

US 2007/0116879 A1 May 24, 2007

(51) Int. Cl.
*C08K 5/00* (2006.01)
*C09B 67/00* (2006.01)
*B05D 1/28* (2006.01)

(52) U.S. Cl.
USPC ........... 106/493; 106/494; 106/499; 106/500; 427/428.01; 427/428.18; 427/429

(58) Field of Classification Search
USPC ............ 106/19, 499, 500; 524/37, 42, 43, 44, 524/45, 46, 446, 366, 376, 377, 378, 523; 260/29.6, 29.7; 427/428.01, 428.18, 427/429
See application file for complete search history.

(56) References Cited

U.S. PATENT DOCUMENTS

| | | | |
|---|---|---|---|
| 3,058,931 A | 10/1962 | Petty | 260/17 |
| 3,370,024 A | 2/1968 | Grasko et al. | 260/3.5 |
| 3,600,346 A * | 8/1971 | Spatola | 427/274 |
| 3,811,904 A | 5/1974 | Zola | 106/193 J |
| 3,816,155 A | 6/1974 | Iverson et al. | 117/10 |
| 3,950,283 A | 4/1976 | Sellars et al. | 260/17 R |
| 4,009,136 A * | 2/1977 | Lewandowski et al. | 523/171 |
| 4,376,654 A | 3/1983 | Zola | 106/163 R |
| 5,114,485 A | 5/1992 | Lynch et al. | 106/311 |
| 5,213,845 A | 5/1993 | Bohrn et al. | 427/280 |
| 5,304,240 A | 4/1994 | Alberto | 106/217 |
| 5,320,835 A | 6/1994 | Pahlck et al. | 424/64 |
| 5,332,599 A * | 7/1994 | Sanborn | 427/259 |
| 5,340,394 A * | 8/1994 | Elsamanoudi | 106/500 |
| 5,616,635 A * | 4/1997 | Patel | 524/37 |
| 5,914,196 A * | 6/1999 | Calvo et al. | 428/523 |
| 6,150,009 A | 11/2000 | Stecker | 428/198 |
| 6,488,760 B1 * | 12/2002 | Binns et al. | 106/499 |
| 6,544,588 B2 | 4/2003 | Yamamori et al. | 427/261 |
| 6,794,434 B2 * | 9/2004 | Collins et al. | 524/366 |
| 6,809,132 B2 | 10/2004 | Sau | |
| 6,942,902 B2 | 9/2005 | Sapper | 427/493 |

OTHER PUBLICATIONS

Coatings, Encyclopedic Dictionary, S. LeSota ed., Federation of Soc. Coatings Technology, Blue Bell, PA, p. 97 (1995) (Definition of "Dry Hard").
Coatings, Encyclopedic Dictionary, S. LeSota ed., Federation of Soc. Coatings Technology, Blue Bell, PA, p. 98 (1995) (Definition of "Drying").
Coatings, Encyclopedic Dictionary, S. LeSota ed., Federation of Soc. Coatings Technology, Blue Bell, PA, p. 98 (1995) (Definition of "Dry to Touch Time").
Coatings, Encyclopedic Dictionary, S. LeSota ed., Federation of Soc. Coatings Technology, Blue Bell, PA, p. 250 (1995) (Definition of "Set to Touch Time").
Degussa Corp., "Colortrend 888/817, Universal Machine Colorants Product Brochure," pp. 1-7 (2003).
Degussa Corp., "Chroma-Chem 844, Industrial Colorants Product Brochure," pp. 1-3 (undated).
Vitaly Buckin et al., "New analytical technique uses ultrasonic spectrometry," Paints & Coatings Industry, Nov. 1, 2002, pp. 1-7: Retrieved from the Internet on May 18, 2006: <URL:http://www.pcimag.com/CDA/Archives/fb16edee696a7010VgnVCM100000f932a8c0.
Paul Marvuglio, Why grind it? Paints & Coatings Industry, Oct. 3, 2000, pp. 1-5: Retrieved from the Internet on May 18, 2006: <URL: http://www.pcimag.com/CDA/Archives/ee84a34a916a7010VgnVCM100000f932a8c0.
International Search Report for International Application No. PCT/US06/40341, dated Apr. 20, 2007.
Written Opinion for International Application No. PCT/US06/40341, dated Apr. 20, 2007.
Behr Process Corporation, "Behr Premium Plus With Style® Venetian Plaster No. 770," (2004-2006). Retrieved from the Internet on Jun. 6, 2006: <URL: http://www.behr.com/behrx/act/view/products_detail?prodGroupId=23&catName=Faux%2FDecorative+Finishes&catId=18>.
Behr Process Corporation, "Behr Premium Plus With Style® Venetian Plaster Topcoat No. 775," (2004-2006). Retrieved from the Internet on Nov. 14, 2006: <URL: http://www.behr.com/behrx/act/view/products_detail?prodGroupId=22&catName=Faux%2FDecorative+Finishes&catId=18>.
Behr Process Corporation, "MSDS for Behr® Premium Plus with Style Venetian Plaster No. 770," (1996-2006). Retrieved from the Internet on Nov. 2, 2006: <URL: http://www.msdsvault.com/msdsvaultx/msdsdisplaycode_adm_BEHR_TYPE.cfm?msds_id=741194&CFID=378928&CFTOKEN=25889887>.
Behr Process Corporation, "MSDS for Behr® Premium Plus with Style Venetian Plaster Topcoat No. 775," (1996-2006). Retrieved from the Internet on Nov. 2, 2006: <URL: http://www.msdsvault.com/msdsvaultx/msdsdisplaycode_adm_Behr_Type.cfm?msds id=741195&CFID=378928&CFTOKEN=25889887>.
DoItYourself.com Community Forums, "Easier than Faux," (2004). Retrieved from the Internet on Nov. 14, 2006: <URL: http://data.doityourself.com/showthread.php?t=190223>.

(Continued)

*Primary Examiner* — Michael Wieczorek
(74) *Attorney, Agent, or Firm* — Marshall, Gerstein & Borun LLP

(57) ABSTRACT

The disclosure is generally related to a coating composition, and more particularly to a decorative effect coating composition capable of producing a multi-colored and/or multi-shaded appearance in a single application.

21 Claims, No Drawings

(56) References Cited

OTHER PUBLICATIONS

Firenze Enterprises, Inc., "Firenze Mineral Wall Coating—Rivesto-Marmorino®," (1997). Retrieved from the Internet on Nov. 2, 2006: <URL: http://www.firenzeenterprises.com/documents/specs/venetian_plaster_rivesto/venetian_plaster_rivesto.htm>.
Firenze Enterprises, Inc., "Venetian Plaster: Marmorino—Fine Grain Rivesto-Marmorino®." Retrieved from the Internet on Nov. 2, 2006: <URL: http://firenzeenterprises.com/fine.htm>.
McCloskey, a Division of the Valspar Corporation, "McCloskey Special Effects Materials Checklist—Sand Tones." Retrieved from the Internet on Nov. 14, 2006: <URL: http://www.whitmanwallpaper.com/fauxfinishing/SANDTONEpage12.pdf>.
McCloskey, a Division of the Valspar Corporation, "McCloskey Special Effects Materials Inventive Faux Finishes; Consumer Product Catalog." Retrieved from the Internet on Nov. 14, 2006: <URL: http://www.valspar.com/val/resident/pdf/SE2pagebrochure.pdf>.
Minneapolis Institute of Faux Finishes, "Tints & Pigments, 'Tuscany Basecoat; Tuscany Expression's Topcoat, Classic Antique,'" p. 11. Retrieved from the Internet on Nov. 14, 2006: <URL: http://www.fauxshoppe.com/Products.htm>.
Rivesto, "Marmorino Product Explanation." Retrieved from the Internet on Nov. 2, 2006: <URL: http://www.rivesto.ch/produ.htm>.
Rivesto, "Marmorino Technical-Instruction-Sheet (TIS)." Retrieved on the Internet on Nov. 2, 2006: <URL: http://www.rivesto.ch/sheet.htm>.
Rivesto, "Marmorino." Retrieved from the Internet on Nov. 2, 2006: <URL: http://www.rivesto.ch/main.htm>.
South Orange Chiropractic Health & Home, "Decoration—Inside & Out: Modern Way to Get Antique Flair," (2001-2003). Retrieved from the Internet on Nov. 14, 2006: <URL: http://www.southorangehealth.org/home_etc.cfm?action=view_article&article_id=586>.
"Valspar Granite Textured Paint," *Coatings World* 8(9):25(a1) (2003).
Valspar Corporation, "Faux Finishing Most Frequently Asked Questions, 'Venetian Plaster'" p. 8, (2006). Retrieved from the Internet on Nov. 14, 2006: <URL: http://www.valspar.com/val/resident/faux_faq_detail.jsp>.
Valspar Corporation, "Signature Colors—Venetian Plaster." Retrieved from the Internet on Nov. 14, 2006: <URL: http://www.valsparatlowes.com/lowes/signature/howto/ht_venetianplaster.pdf>.

\* cited by examiner

DECORATIVE EFFECT COATING COMPOSITIONS AND METHODS OF MAKING AND APPLYING SAME

BACKGROUND OF THE DISCLOSURE

1. Field of the Disclosure

The disclosure is generally related to coating compositions, and more particularly to decorative effect coating compositions capable of producing multi-colored and/or multi-shaded appearances in a single application.

2. Brief Description of Related Technology

Most prior art coating compositions produce coatings having single- or solid-colored appearances after application to a surface. Therefore, multiple applications of different coating composition products are often required when consumers wish to create coatings having multi-colored appearances. Alternatively, consumers can utilize known multi-color coating compositions that provide desired multi-colored decorative effects in a single application.

U.S. Pat. No. 3,058,931 discloses a multi-color coating composition that produces a coating having a mottled appearance in a single application. The coating includes an "aqueous base" containing a protective colloid, one or more pigments essential to hiding quality and to control gloss level of the product, and an emulsion polymer. A pigmented varnish vehicle that is prepared by grinding colored pigments into a resinous varnish vehicle. The contrast between the large, macroscopic pigmented varnish particles and the non-colored aqueous base of the resultant composition provides a coating having a mottled appearance after a single application. The '931 patent emphasizes that pigmented varnish vehicles having at least one hydrophilic number less than 60 (or a hydrophilic/lipophilic balance ("HLB") value of less than 12) must be used in order to prevent the degradation of the hydrophobic macroscopic varnish particles (and thus the mottled appearance of the applied coating). Further, because the coating composition is merely capable of providing a mottled appearance, it does not provide consumers with the ability to create customized decorative patterns.

U.S. Pat. No. 3,811,904 discloses another multi-color coating composition that produces a coating having a mottled appearance in a single application. The coating composition contains "globules" of solvated polymer that have been colored by addition of pigment before the polymer is cross-linked. In a stable dispersion, the globules of cross-linked polymers are dispersed in a liquid in which they are relatively immiscible, and do not coalesce with one another. Therefore, the stable globules provide the applied coating with a mottled appearance. In a transient dispersion, the coating composition contains two solutions (or a continuous phase and a discontinuous phase) of incompatible polymers, which generally have been colored by addition of pigment before cross-linking. The polymer globules of the dispersed phase coalesce with one another to form larger particles, and provide a coating having a mottled appearance. Additionally, a striated pattern can be formed when shear is applied to the applied coating when the coating is still wet because both the dispersed and continuous phases (i.e., the two polymer solutions) flow without mixing. However, the nature of the globules causes the resulting coating appearance to include discontinuous streaks or bursts of color where shear is applied.

U.S. Pat. No. 3,600,346 discloses an additional multi-color coating composition that produces a coating having a grained or antique appearance (or "finish") in a single application. The coating composition contains a primary pigment dispersed in an oil modified alkyd resin vehicle. The coating composition further includes a secondary pigment, which is encapsulated by a resin that is immiscible with the oil-modified alkyd resin vehicle. Application of shear to an applied wet coating causes the secondary pigment to be released from its resinous capsule (or "shell") thereby providing a grained or antiqued appearance to the finish. Similar to the globules of the '904 patent, the nature of the encapsulated secondary pigments causes the resulting coating appearance to include discontinuous streaks or bursts of color where shear is applied.

DETAILED DESCRIPTION

The disclosure provides initially solid-colored coating compositions or paints containing at least one tinting colorant and methods of making the same. The initially solid-colored coating compositions are formulated such that a portion of the tinting colorant(s) is incompatible with the remaining components of the coating compositions and thus separates, concentrates, flocculates, and/or floats from an applied coating composition to the exterior-facing surface of the still-forming coating while the coating composition is still in a "liquid and/or quasi-liquid state" (i.e., before the coating composition has completely dried and formed a "coating"), thereby creating a final (or formed) coating having a multi-colored and/or multi-shaded appearance in a single application. Thus, the initially solid-colored coating compositions of the disclosure eliminate the need to perform multiple application steps and/or to use multiple products (such as multiple solid-colored coating compositions) in order to create final coatings that exhibit desired decorative effects including but not limited to multiple colors and/or multiple shades. Advantageously, the initially solid-colored coating compositions can be applied via any conventional paint application method including but not limited to brushing, rolling, and spraying.

In one embodiment, the initially solid-colored coating compositions form a coating having a multi-colored and/or multi-shaded appearance in a single application by virtue of their response to shear applied while the coating compositions are still in a liquid state and/or a quasi-liquid state. According to this embodiment, the application of shear generally increases the instability or incompatibility of the tinting colorant(s) with the other components of the applied coating composition, and can therefore be selectively applied to form color differences (or patterns) at specific locations in the final formed coating. More specifically, application of shear to the surface of a still-forming coating advantageously increases the amount of and/or causes the tinting colorant(s) to separate, concentrate, flocculate, and/or float from the coating composition to the still-forming coating surface, while the coating composition is still in a liquid and/or quasi-liquid state, and can thereby be selectively applied to specific areas or regions of the still-forming coating to form patterns in the final coating and/or create a desired decorative effect at specific locations of the final coating. Shear can be applied by any manner including but not limited to hand tools such as metal spatulas, putty knives, and brushes, other implements such as sponges and cloths, and/or even an individual's hand (or fingers).

Generally, the terms "liquid state," "quasi-liquid state," and "liquid state and/or quasi-liquid state" are used herein to indicate that the coating composition has not yet formed a final coating. During drying, coatings generally change from the liquid to solid state due to evaporation of the solvent and/or because of physical and/or chemical reactions of the binder media [Coatings Encyclopedic Dictionary, S. LeSota, Ed., Federation of Soc. for Coatings Technology, Blue Bell, Pa., 1995].

In one embodiment, the terms "liquid state," "quasi-liquid state," and "liquid state and/or quasi-liquid state" mean the coating composition has not yet completely dried or "dried hard." As generally defined throughout the coatings industry, a coating composition has dried hard (and formed a final coating) as soon as any mark made by exerting maximum downward pressure on the coating (or film) is completely removed with light polishing with a soft cloth [Coatings Encyclopedic Dictionary, supra].

In another embodiment, the terms "liquid state," "quasi-liquid state," and "liquid state and/or quasi-liquid state" mean any time period before the coating composition "set-to-touch" or "dry-to-touch" time. As generally defined throughout the coatings industry, the dry-to-touch time is when the internal cohesive forces of the coating composition exceed the adhesive forces of the coating composition (to a substrate surface). A simple touch test can be used to determine whether a coating has dried-to-touch: a coating is not "tacky" or sticky to the touch when a coating is dried-to-touch [Coatings Encyclopedic Dictionary, supra].

In view of the foregoing discussion, shear is generally applied after the coating composition has been applied to a surface, and prior to the time when the coating composition has completely dried. More typically, shear is applied about 30 seconds, about 45 seconds, about 60 seconds, and/or about 90 seconds after the coating composition has been applied, and prior to the time when the coating composition is dry-to-touch (i.e., while the coating remains tacky or sticky to touch). Of course, the time required for coatings to completely dry and/or to dry-to-touch will vary based on the thickness of the coatings applied and the nature and porosity of the specific substrate, but can be easily determined as described above.

Typically, an applied coat having a wet film thickness of about 1 mil to about 10 mils provides a final coating having a dry film thickness of about 0.5 mils to about 5 mils. Such applied coats generally dry hard in about 30 minutes to about 60 minutes under normal drying conditions (77° F. and 50% relative humidity), and dry-to-touch in about 1 minute to about 10 minutes (and more typically, in about one minute to about five minutes) under normal drying conditions (77° F. and 50% relative humidity).

In another embodiment, shear is not applied while the coating composition is still in a liquid and/or quasi-liquid state. In this embodiment, the initially solid-colored coating composition dries to form a final coating having a mottled, spotted, or clustered appearance. As in the other embodiment (where shear is applied), the observed decorative effect is generally caused by the incompatibility of the tinting colorant(s) with the other components of the applied coating composition. However, in the coating compositions according to this embodiment, the tinting colorants are initially miscible with the other components of the coating compositions, but become incompatible (with the other coating composition components) as the coating composition begins to dry (i.e., as the solvent dries and/or the binder media reacts) [Coatings Encyclopedic Dictionary, supra].

Thus, in the coating compositions according to the disclosure, the instability or incompatibility of the tinting colorant(s) with the other components of the applied coating composition is exploited, while the coating composition is still in a liquid and/or quasi-liquid state, to create a desired multi-colored and/or multi-shaded decorative effect. As explained above, in some embodiments, the instability or incompatibility of the tinting colorant(s) with the other components of the applied coating composition can be accelerated and/or accentuated by applying shear (e.g., via hand tooling) to the applied coating composition while the coating composition is still in a liquid and/or quasi-liquid state. Instability or incompatibility of the tinting colorant(s) with the other components of the coating compositions can be obtained in coating compositions containing a single tinting colorant, but visual effects are more easily demonstrated when the coating compositions contain a combination of (at least) first and second tinting colorants, which are immiscible with one another. Tinting colorant instability or incompatibility can also be obtained by starving or minimizing the amounts of surfactants, dispersants, and/or wetting agents in the coating compositions as such components generally facilitate colorant compatibility between water-base and oil-base components and/or systems.

Although generally visible and perceptible to an ordinary consumer, the decorative effects of the coating compositions can also be demonstrated (and measured) by using conventional spectrophotometers. Such spectrophotometers can "measure" color and provide the results in a format known as CIE LAB. The three parameters L*a*b* define a three-dimensional "color space." L* is the luminance or black-to-white component of the sample, and a* and b* are the color components of the sample. The color difference or ΔE between two different colors (e.g., two differently colored areas of a multi-colored decorative coating in accordance with the disclosure) ranges from 340 to 0 (or no color difference), and can be determined by measuring the colors and calculating the color difference, as follows:

$$\Delta E=[(L1-L2)^2+(a1-a2)^2+(b1-b2)^2]^{1/2} \quad \text{Equation 1:}$$

Consumers can detect ΔE values as low as about 0.25, and thus multi-colored coatings (or portions thereof) demonstrating ΔE values greater than about 0.25 demonstrate decorative effects in accordance with the disclosure. However, higher ΔE values are generally more desirable because they are typically more perceptible to an ordinary consumer (relative to the detection threshold value), and therefore provide more demonstrable decorative effects in accordance with the disclosure. Thus, in various embodiments, the ΔE values of the coatings are greater than about 1, greater than about 2, greater than about 4, and/or greater than about 5. Additionally, excessively high ΔE values may also not always be desirable because the color contrast may be too severe for a particular consumer or desired decorative effect (e.g., more subtle color changes or multi-shaded coatings may be desired). Accordingly, in additional embodiments, the ΔE values of the coatings are less than about 200, less than about 100, less than about 75, and/or less than about 50. Furthermore, in other embodiments, the coatings exhibit ΔE values from about 1.0 to about 200, from about 2 to about 100, from about 4 to about 75, and/or from about 5 to about 50.

The coating compositions generally comprise at least a first tinting colorant, a thickener, a surfactant, and a binder, which are generally dispersed (or dissolved) in one or more conventional organic solvents and/or an aqueous solution. At least one non-tinting filler/base pigment is also typically included in the coating compositions. Furthermore, the coating compositions often include a defoamer and/or a wetting agent, and can also include other additional optional components.

As previously explained, visual effects are more easily demonstrated when the coating compositions contain a combination of (at least) first and second tinting colorants, which are immiscible with one another. Thus, the coating composition can further include a second tinting colorant that has a physical property which is different relative to the first tinting colorant such that the first and second tinting colorants are immiscible with one another. For example, the first tinting colorant can be an aqueous tinting colorant, and the second tinting colorant can be a non-aqueous tinting colorant. Similarly, the first tinting colorant can be a hydrophilic tinting colorant, and the second tinting colorant can be a hydrophobic tinting colorant. In an alternative embodiment, one of the tinting colorants may be a universal tinting colorant capable of being solvated and/or uniformly dispersed in both aqueous and non-aqueous coating compositions. When one of the tinting colorants is a universal tinting colorant, it is generally preferred that the second tinting colorant is generally incompatible (or immiscible) with the coating composition vehicle (i.e., a mixture comprising the other components of the coating composition).

The coating composition pigment volume concentration ("PVC") is a ratio of the volume of pigment(s) to the volume of total non-volatile material, e.g., pigment(s) plus binder, and generally ranges from about 5% to about 95%, from about 10% to about 80%, and/or from about 15% to about 65%. The coating composition pigment/binder ratio of total pigment to binder solids generally ranges from 25 to about 1, from about 20 to about 2, and/or from about 15 to about 5. Higher values are generally preferred for both PVC and pigment/binder ratio because higher pigment contents provide additional sources of friction in the coating compositions, which can be exploited in situ to help develop desired decorative effects. Furthermore, higher values may be beneficial for providing opacity to the formed coatings and/or increasing the permeability of the coating into the substrate.

Tinting Colorant(s)

The coating composition includes at least one tinting colorant, but more preferably includes two tinting colorants. The coating composition may also contain three or more tinting colorants. The tinting colorant(s) may be an aqueous tinting colorant, a non-aqueous tinting colorant, a hydrophobic tinting colorant, a hydrophilic tinting colorant, or an universal tinting colorant. In some instances, a particular tinting colorant may be classified within two or more of the preceding categories. For example, a tinting colorant may be both an aqueous tinting colorant and an universal tinting colorant. Similarly, a tinting colorant may be both a non-aqueous tinting colorant and a hydrophobic tinting colorant, or an aqueous tinting colorant and a hydrophilic tinting colorant. The degree of the color difference and the color itself can be advantageously controlled by selection and concentration of the tinting colorant(s).

The tinting colorant(s) may generally be any tinting colorant(s) including but not limited to pigments and dyes, provided that at least one tinting colorant (or portion thereof) is capable of separating, concentrating, flocculating, and/or floating from a still-wet, applied coating composition to the surface of the still-forming coating so as to provide a final or formed coating having a multi-colored and/or multi-shaded decorative effect in a single application. Most often, the colorant comprises a pigment dispersion. As used herein, the term "tinting colorant" does not include white, opacifying pigments such as titanium dioxides and zinc oxides (which are instead defined herein to be "non-tinting filler/base pigments"). However, tinting colorants in accordance with the disclosure can be dispersions of white, opacifying pigments (such as titanium dioxides and zinc oxides), which are capable of separating, concentrating, flocculating, and/or floating from a still-wet, applied coating composition to the surface of the still-forming coating because of their incompatibility with other components of the coating compositions, as previously described.

If only a single tinting colorant is included, the tinting colorant may be an aqueous tinting colorant, a non-aqueous tinting colorant, a hydrophobic tinting colorant, a hydrophilic tinting colorant, or an universal tinting colorant, but it is generally preferable for the tinting colorant to be somewhat incompatible with and/or unstable in the still-forming coating such that the tinting colorant is capable of separating, concentrating, flocculating, and/or floating from an applied (still-wet) coating composition to the exterior surface of the still-forming coating. Thus, it is generally preferred to use either an aqueous tinting colorant and/or a hydrophilic colorant in solvent- or oil-based coating compositions (whether or not such tinting colorant is also capable of being classified as an universal colorant). Similarly, it is generally preferred to use a non-aqueous tinting colorant and/or a hydrophobic tinting colorant in water-based-latex-containing coating compositions (whether or not such tinting colorant is also capable of being classified as an universal colorant).

As previously set forth, the coating compositions may further include a second tinting colorant, a third tinting colorant, or even more tinting colorant(s). In all such cases, it is generally preferred for the second (or third) tinting colorant to have a physical property which is different relative to the first tinting colorant such that at least two of the tinting colorants are substantially immiscible (i.e., less than 10 wt. %, less than 5 wt. %, and/or less than 2 wt. % of the combination is miscible) with one another. For example, the first tinting colorant can be an aqueous tinting colorant, and the second tinting colorant can be a non-aqueous tinting colorant. Additionally, the first tinting colorant can be a hydrophilic tinting colorant, and the second tinting colorant can be a hydrophobic tinting colorant. Alternatively, one of the tinting colorants may be a universal tinting colorant capable of being solvated and/or uniformly dispersed in both aqueous and non-aqueous coating compositions, and the other tinting colorant may be selective for either aqueous or non-aqueous systems.

When one of the tinting colorants is a universal tinting colorant, it is preferred that the second tinting colorant is relatively incompatible with the other components of the coating composition such that the second tinting colorant is capable of separating, concentrating, flocculating, and/or floating from an applied (still-wet) coating composition to the surface of the still-forming coating. Thus, in an oil-based coating composition including a universal tinting colorant, it is generally preferred to use either an aqueous tinting colorant or a hydrophilic tinting colorant as the second tinting colorant. Similarly, in a latex-based coating composition including a universal tinting colorant, it is generally preferred to use a non-aqueous tinting colorant or a hydrophobic tinting colorant as the second tinting colorant.

Useful tinting colorants can be obtained from a number of commercial sources including but not limited to Degussa Corporation, New Jersey; Heucotech Ltd., Pennsylvania; Noveon Inc. Performance Coatings, Ohio; Pflaumer Brothers, Inc., New Jersey; Reitech Corporation, Pennsylvania; CPS Color Equipment, Inc., North Carolina; Eagle Sales Co., Missouri; Engelhard Corp., New Jersey; Lanxess (formerly Bayer Chemicals), Pennsylvania; Nanostructured & Amorphous Materials, Inc., New Mexico; Pan Technology, Inc., New Jersey; Plasticolors Inc., Ohio; Raffi and Swanson Inc., Massachusetts; Ralston Colour Systems B.V., Netherlands; Wolstenholme International, Inc., Illinois. In various embodiments, the initially solid-colored coating composition comprises about 1 wt. % to about 40 wt. %, about 2.5 wt. % to about 30 wt. %, and/or about 5 wt. % to about 20 wt. % of the tinting colorant(s).

Suitable hydrophobic tinting colorants generally contain at least one pigment dispersed in a hydrophobic resin vehicle. Both organic and inorganic pigments can be effectively dispersed in hydrophobic resin vehicles. In one aspect, the hydrophobic tinting colorant has a solids content of about 100 wt. %. In an additional aspect, the resin is a hydroxyl-functionalized unsaturated polyester, which is advantageously compatible with conventional polyester resins and conventional vinyl ester resins. However, the chemical composition of a suitable hydrophobic tinting colorant is not of particular importance provided that it is generally immiscible with an aqueous solution (or system). Analogously, the composition of the hydrophobic resin vehicle is not of particular importance provided that it is hydrophobic. Tinting colorants marketed under the trade name POLYTREND® (Degussa Corporation, New Jersey) are exemplary hydrophobic tinting colorants.

Suitable non-aqueous tinting colorants generally contain at least one is pigment dispersed in an organic solvent/resin combination. Both organic and inorganic pigments can be effectively dispersed in the solvent/resin combination. In one aspect, the solvent is a blend of propylene glycol monomethyl ether acetate and napthol spirits. In another aspect, the resin is a thermoplastic resin, for example, a thermoplastic acrylic resin. Suitable non-aqueous tinting colorants may also contain one or more surfactants. Suitable non-aqueous tinting colorants are typically compatible with many non-aqueous coating systems including alkyds, epoxies, lacquers, polyesters, and polyurethanes. The chemical composition of a suitable non-aqueous tinting colorant is not of particular importance provided that it is generally immiscible with an aqueous solution (or system). Tinting colorants marketed under the trade name CHROMA-CHEM® (Degussa Corporation, New Jersey) are exemplary non-aqueous tinting colorants.

Suitable universal colorants are generally compatible (or miscible) with both aqueous and non-aqueous solutions (or systems). Such colorants often comprise at least one pigment dispersed in either an aqueous solution or a non-aqueous solution, and generally do not contain any resin. Organic and/or inorganic pigments can be included. The behavior/performance of a particular colorant in aqueous and non-aqueous solutions, and not its chemical composition, determines whether it may be classified as an universal colorant. Tinting colorants marketed under the trade name COLOR-TREND® (Degussa Corporation, New Jersey) are exemplary universal colorants.

Suitable hydrophilic tinting colorants generally contain at least one pigment dispersed in a hydrophilic resin vehicle. Both organic and inorganic pigments can be effectively dispersed in suitable hydrophilic resin vehicles. In one aspect, the hydrophilic tinting colorant has a solids content of about 100 wt. %. In an additional aspect, the resin is a polyamide or a polyurethane. However, the chemical composition of a suitable hydrophilic tinting colorant is not of particular importance provided that it is generally immiscible with a non-aqueous solution (or system). Analogously, the composition of the hydrophilic resin vehicle is not of particular importance provided that it is hydrophilic.

Suitable aqueous tinting colorants generally contain at least one pigment dispersed in an aqueous solution/resin combination. Both organic and inorganic pigments can be used. In one aspect, the resin is an acrylic. However, the chemical composition of a suitable hydrophilic tinting colorant is not of particular importance provided that it is generally immiscible with a non-aqueous solution (or system). Tinting colorants marketed under the trade name AQUA-CHEM® (Degussa Corporation, New Jersey) are exemplary aqueous tinting colorants.

Thickener(s)

One or more thickeners are typically included in the coating compositions to provide certain desired rheological properties. For example, thickeners are often added to provide the coating compositions with viscosity values of about 50 krebs units (KU) to about 140 KU, about 70 KU to about 120 KU, and/or about 80 KU to about 110 KU. Stormer-type viscosimeters can be used to measure the viscosity of the coating compositions. Suitable thickeners for use in the initially solid-colored coating compositions include but are not limited to cellulosic thickeners, gelling clays, associative thickeners, and combinations thereof.

Exemplary cellulosic thickeners include but are not limited to cellulose ethers having a molecular weight between about 1000 daltons and 500,000 daltons, e.g., alkyl hydroxypropyl cellulose ethers, hydroxypropyl methyl celluloses, xanthan gums, carboxymethylcelluloses, hydroxyethylcelluloses, sodium alginates and other salts of alginic acid, carrageenans, gum arabic (mixed salts of arabic acid), gum karaya (an acetylated polysaccharide), gum tragacanth (a complex mixture of acidic polysaccharides), gum ghatti (the calcium and magnesium salt of a complex polysaccharide), guar gum (a straight chain galactomannan) and its derivatives, locust bean gum (a branched galactomannan), tamarind gum, psyllium seed gum, quince seed gum, larch gum, pectin and its derivatives, dextrans, and hydroxypropylcelluloses. The initially solid-colored coating composition typically comprises from about 0.01 wt. % to about 5 wt. %, about 0.05 wt. % to about 2.0 wt. %, and/or about 0.10 wt. % to about 1.0 wt. % of the cellulosic thickener.

The alkyl group of useful alkyl hydroxypropyl celluloses may contain up to 9 carbon atoms, but usually the alkyl group contains from one to three atoms. Hydroxypropyl methyl celluloses having an average of about two hydroxypropyl and/or methoxypropyl groups per anhydroglucose unit are often used. The viscosity of an aqueous solution containing about 2 wt. % of a suitable alkyl hydroxypropyl cellulose ether at 20° C. is about 60,000 centipoises (cps) to about 90,000 cps as measured with an Ubbelohde tube capillary viscometer. Alternatively, similar measurements can be made with a Brookfield rotational viscometer at a speed between about 2.5 rpm and 5 rpm. In one refinement, the initially solid-colored coating composition contains about 0.25 wt. % of an alkyl hydroxypropyl cellulose ether. Of course, other types of cellulosic thickeners may also be used, and a greater quantity may be needed if a lower viscosity thickener is used (or vice versa). Exemplary alkyl hydroxypropyl cellulose ethers are marketed under the METHOCEL® trade name (The Dow Chemical Company, Michigan).

Suitable gelling clays for use in the coating compositions are hormite clays comprising natural and/or synthetic dimensionally layered sheet structures of tetrahedrally coordinated silica linked to parallel sheets of octahedrally coordinated alumina, magnesium oxide, silicates, and/or phyllosilicates. Such gelling clays include but are not limited to attapulgites, sepiolites, bentonites, laponites, nontronites, beidellites, laponites, yakhontovites, zincsilites, volkonskoites, hectorites, saponites, ferrosaponites, sauconites, swinefordites, pimelites, sobockites, stevensites, svinfordites, vermiculites, water-swellable synthetic clays, smectites, e.g., montmorillonites, particularly sodium montmorillonite, magnesium montmorillonite, and calcium montmorillonite, illites, mixed layered illite/smectite minerals such as rectorites, tarosovites, and ledikites, magnesium aluminum silicates, and admixtures of the clays named above. Palygorskite attapulgite clays are generally preferred. The initially solid-colored coating composition typically comprises from about 0.01 wt. % to about 10 wt. %, about 0.05 wt. % to about 5.0 wt. %, and/or about 0.10 wt. % to about 2.0 wt. % of the gelling clay. Useful gelling clays include those marketed under the MIN-U-GEL® trade name (Floridin Company, FL), and those marketed under the ATTAGEL® trade name (Engelhard Corporation, NJ). Such clays are available in different particle sizes.

Suitable associative thickeners for use in the coating compositions include hydrophobically modified ethoxylated urethanes (HEUR), hydrophobically modified alkali-swellable emulsions (HASE), and styrene-maleic anhydride terpolymers (SMAT). HEUR thickeners (also generally known as polyurethane or PUR associative thickeners) are generally preferred in aqueous, latex-based coating compositions. Acidic acrylate copolymers (cross-linked) of ethyl acrylate and methacrylic acid, and acrylic terpolymers (cross-linked) of ethyl acrylate, methacrylic acid, and nonionic urethane surfactant monomer may also be used as associative thickeners. When one or more suitable associative thickeners are used, the thickening reaction is caused in part by either association between the associative thickener and at least one other particle of the coating composition (e.g., a pigment particle or resin particle) or another associative thickener molecule. In various embodiments, the initially solid-colored coating composition typically comprises from about 0.01 wt. % to about 10 wt. %, about 0.05 wt. % to about 5.0 wt. %, and/or about 0.50 wt. % to about 3.5 wt. % of the associative thickener. Useful associative thickeners include those marketed under the ALCOGUM® trade name (Alco Chemical Company, TN), the VISCALEX® trade name (Ciba Specialty Chemicals, NY), and the ACRYSOL® trade name (Rohm & Haas, PA).

In one embodiment, the thickener comprises a HEUR and a cellulose ether, e.g., an alkyl hydroxypropyl cellulose ether. Without intending to be bound by theory, it is believed that the combination of an associative thickener and a cellulose ether provides improved application and storage properties to the coating compositions. For example, the lubricity and leveling of the coating compositions (when applied to a substrate) can be improved by using such a combination of associative thickener and cellulose ether. Additionally, such a combination can help prevent the various pigments of the coating compositions from settling out (when the coating compositions are stored in bulk). The coating composition thickener may further include a gelling clay.

The thickener system generally performs best under alkaline conditions. Thus, it is generally advisable to include a basic material in the coating composition in order to give the final coating composition a pH of at least about 8.0. A variety of basic materials may be used to increase the pH including but not limited to ammonia, caustic soda (sodium hydroxide), tri-ethylamine (TEA), and 2-amino-2-methyl-1 propanol (AMP). In various embodiments, the initially solid-colored coating composition comprises about 0.001 wt. % to about 5 wt. %, about 0.01 wt. % to about 0.5 wt. %, and/or about 0.025 wt. % to about 0.50 wt. % of the basic material.

Surfactant(s)

Surfactants with hydrophilic/lipophilic balance (HLB) values below 9 are generally considered to be lipophilic, those with values between 11 and 20 are generally considered to be hydrophilic, and those with values between 9 and 11 are generally considered to be intermediate. It is sometimes advisable to include a blend of two or more nonionic surfactants (rather than a single surfactant molecule) in the coating compositions of the disclosure. The HLB values of surfactants are additive, and thus the HLB value of the surfactant blend can be easily determined. For example, the HLB value of a blend comprising 40 wt. % of a first surfactant moiety having a HLB value of about 15 and 60 wt. % of a second surfactant moiety having a HLB value of about 4.3 equals [15.0×0.4] plus [4.3×0.6] or 8.8.

When the coating composition is a water-based, latex-containing composition, it generally includes a surfactant (or surfactant blend) having a HLB value below about 9. Typically, the surfactant is substantially non-ionic in character, e.g., more than 60 wt. %, more than 70 wt. %, more than 80 wt. %, and/or more than 90 wt. % of the surfactant moieties are non-ionic. Surfactants (or surfactant blends) having HLB values less than about 9, less than about 7, and/or less than about 5 are generally preferred in the water-based, latex-containing coating compositions because they form smaller micelles in solutions, and therefore the micellular "solubilizing" and/or "emulsifying" interactions with the tinting colorants of the coating composition are more easily disrupted. Disrupting such micelles releases the previously solubilized colorant(s) from the coating composition itself such that the colorant(s) can separate, concentrate, flocculate, and/or float from an applied (still-wet) coating composition to the exterior surface of the still-forming coating and thereby contribute to the development of a color difference in the final coating.

Conversely, the coating composition generally includes a surfactant having a HLB value greater than about 11 when the coating composition is an oil-based composition. Surfactants (or surfactant blends) having HLB values greater than about 11, greater than about 13, and/or greater than about 15 are generally preferred in the oil-based coating compositions because they form smaller micelles in the non-polar solutions typically used in oil-based coating compositions, and therefore their solubilizing or emulsifying interactions with the tinting colorants of the coating composition are more easily disrupted.

In both latex- and oil-based coating compositions, the upper amount of surfactant(s) used in the coating compositions is minimized to provide desired visual effects, as will be discussed in more detail below. Generally, the coating composition should include at least enough surfactant to permit micelle formation (in the liquid form of the coating composition) and to render the base coating composition stable (i.e., to keep the colorants and/or the non-tinting filler/base pigment(s) of the coating composition substantially dispersed and/or dissolved in the liquid coating composition). However, the coating composition should not include an amount of surfactant that is sufficient to provide full color development, i.e., the coating composition should not include an amount sufficient to allow the added tinting colorant(s) to achieve its full tinting potential. Relative to conventional coating compositions, the disclosed coating composition can therefore be referred to as "surfactant-starved." Generally, the surfactant is present in an amount between about 0.01 wt. % and about 5 wt. %, between about 0.01 wt. % and about 3.0 wt. %, and/or between about 0.1 wt. % and about 1 wt. %, based on the weight of the liquid form of the coating composition.

When the coating composition includes a surfactant in an amount sufficient to allow the added tinting colorant to achieve its full tinting potential (i.e., too much surfactant), additional mixing or shear (after a routine amount of mixing has already been performed) will not change the color of the liquid coating composition. Similarly, a particular coating composition has too much surfactant when a simple rub test (e.g., the still-wet, applied coating composition is applied to a paper substrate and rubbed about 5 seconds, about 10 seconds, 20 seconds, and/or 30 seconds after application) does not generate a perceptible color difference (relative to an area that has not been rubbed). Furthermore, high resolution ultrasonic spectroscopic analysis (HR-US) can be used to determine the critical surfactant (or surfactant blend) concentration needed for micelle formation (which is greater than or equal to the upper-most limit for the surfactant) in a given coating composition.

Suitable non-ionic surfactants having a HLB value below about 9 include but are not limited to octylphenol ethoxylates and nonylphenol ethoxylates Useful non-ionic surfactants having HLB values below about 9 are marketed under the TRITON™ and TERGITOL™ trade names (The Dow Chemical Company, Michigan). Suitable non-ionic surfactants having a HLB value greater than about 11 include octylphenol ethoxylates and nonylphenol ethoxylates which have more ethylene oxide units than the non-ionic surfactants having a HLB value below about 9. Useful surfactants having HLB values greater than about 11 are also marketed under the TRITON™ trade name (The Dow Chemical Company, Michigan). Other surfactants may also be used provided that the HLB value for the (blend of) surfactant(s) is as previously described for either of the latex- or oil-based coating compositions.

Binder

The coating compositions typically include binder. The binder can be any suitable film-forming resin capable of forming a solid film and binding pigments together to the surface to which the coating composition is applied. Suitable binders include but are not limited to latex emulsion media and oil-based media. Suitable latex emulsion media for use in the coating compositions according to the disclosures include but are not limited to vinyl acetates, for example, ethylene vinyl acetate, and acrylics, for example, vinyl acrylics and styrenated acrylics. Suitable oil-based media include carboxyl- and hydroxyl-functionalized acrylics, alkyds, polyurethanes, polyesters, and epoxies. The initially solid-colored coating composition typically comprises from about 1 wt. % to about 40 wt. %, about 5 wt. % to about 30 wt. %, or about 10 wt. % to about 20 wt. % of the binder (binder wt. % includes solids only).

Useful latex emulsion media include acrylic polymers, vinyl acrylic polymers, for example, vinyl acetate-butyl acrylate copolymers, styrene acrylic polymers, and vinyl acetate polymers marketed under the UCAR™ and NEOCAR™ trade names (The Dow Chemical Company, Michigan) such as UCAR™ 367; emulsion polymers products marketed under the VINREZ® trade name (Halltech, Inc., Ontario); vinyl acrylic polymers marketed under the PLIOWAY® trade name (Eliokem, Ohio); acrylic, vinyl acrylic, and styrene acrylic latex polymers marketed under the AQUAMAC™ trade name (Resolution Specialty Materials, LLC, Illinois). An exemplary vinyl acrylic resin is VINREZ® 663 V15, which has a glass temperature of about 18° C. and an average mean particle size of about 0.35 microns. Another exemplary vinyl acrylic copolymer vehicle is marketed under product identification no. HP-31-496 (Halltech, Inc., Ontario), and has a glass temperature of about 0° C.

Suitable functionalized acrylics, alkyds, polyurethanes, polyesters, and epoxies can be obtained from a number of commercial sources. Useful acrylics are sold under the ACRYLOID™ trade name (Rohm & Haas, Co., Pennsylvania); useful epoxy resins are sold under the EPON™ trade name (Resolution Specialty Materials, LLC, Illinois); useful polyester resins are sold under the CYPLE® trade name (Cytec Industries, New Jersey); and useful vinyl resins are sold under the UCAR™ trade name (The Dow Chemical Company, Michigan).

Non-Tinting Filler/Base Pigment(s)

The non-tinting filler/base pigments generally do not appreciably color the initially solid-colored coating composition, but generally provide background color to the compositions and thus can be used to minimize tinting colorant costs and/or modify or enhance certain properties of the coating composition (such as hiding power, abrasion resistance, washability, scrubbability, absorption (or permeability into the substrate), and drying time). The non-tinting filler/base pigments are therefore not necessary to produce the multicolored decorative effect coating of the disclosure. Generally, any solid, inert mineral or mineral-like filler/pigment materials can be added provided that the particle size thereof is sufficiently large so as to not adversely effect the flow characteristics of the coating composition. The particle size is, however, typically limited in order to avoid problems during spraying. Exemplary non-tinting filler/base pigments suitable for use in the initially solid-colored coating compositions include but are not limited to talcs, gypsums (i.e., hydrated calcium sulphates), calcium carbonates, nepheline syenites, micas, calcined kaolin clays, delaminated kaolin clays, titanium dioxides, lithophones, wallastonites, and bismuth oxychlorides. Additional non-tinting filler/base pigments suitable for use in the initially solid-colored coating compositions include opacifying pigment such as titanium dioxides and zinc oxides.

In various refinements, the mean particle size of the non-tinting filler/base pigment is about 0.1 microns to about 150 microns, about 0.5 microns to about 60 microns, and/or about 0.6 microns to about 25 microns. In various embodiments, the initially solid-colored coating composition typically comprises from about 1 weight percent ("wt. %") to about 45 wt. %, about 15 wt. % to about 40 wt. %, and/or about 20 wt. % to about 35 wt. % of the non-tinting filler/base pigment(s) (in total). Generally, however, the initially solid-colored coating composition may contain about 1 weight percent ("wt. %") to about 30 wt. %, about 2 wt. % to about 20 wt. %, and/or about 3 wt. % to about 10 wt. % of any specific non-tinting filler/base pigment.

Useful micas should have an average mean particle size (or equivalent spherical diameter) between 10 microns and 150 microns, and typically have the form of flat plates. A suitable mica is available under the trade name P-80F (United States Gypsum Company, Illinois). The mean particle size of the mica is generally about 50 microns. Additionally, about 97.5 wt. % of the particles in the mica have a particle size less than about 150 microns. Particle size can be determined by sedimentation analysis, for example, using a SEDIGRAPH™ particle size analyzer (Micromeritics Instrument Corporation, GA) or by laser diffraction analysis, for example, using a SYMPATEC™ particle size analyzer (Sympatec Inc., NJ).

Useful nepheline syenites typically are typically nodular particles. A suitable nepheline syenite is marketed under the trade name MINEX® (e.g., MINEX® 7) (Unimin Corporation, Connecticut). Other suitable non-tinting filler/base pigments include but are not limited to talcs marketed under the MISTRON® trade name including MISTRON® ZSC (Luzenac North America, Colorado); ground calcium carbonates marketed under the OMYACARB® trade name including OMYACARB® 6PT and OMYACARB® UF (Omya Inc, Vermont); calcined kaolin clays marketed under the HUBER® trade name including HUBER® 70-C (Huber Engineered Materials, Georgia); hydrous aluminosilicates marketed under the trade name ASP® including ASP®-400 (Engelhard Corporation, New Jersey); precipitated calcium carbonates available under the M-60 trade name (Mississippi Lime Company, Illinois); and, ground calcium carbonates available under the DURAMITE® trade name (Imerys, Georgia).

Titanium dioxide is a good reflector of light and provides the coating compositions with improved hiding power. Using an opacifying pigment such as titanium dioxide also allows the contractor to adjust the color of the coating compositions on the job site so as to match the desired color of a final decorative paint. Rutile titanium dioxide is generally preferred for use as an opacifying pigment, but anatase titanium dioxide and other opacifying pigments could be used. Useful titanium dioxides are available under the TIPURE® (DuPont Company, Wilmington, Del.), TIONA® (Millennium Chemicals, Maryland), and TRONOX® (Tronox Incorporated, Oklahoma) trade names. Suitable titanium dioxide include TIONA® TR-90 and TRONOX® 821. When present, the initially solid-colored coating compositions typically comprise from about 0 wt. % to about 20 wt. %, about 3 wt. % to about 16 wt. %, or about 5 wt. % to about 12 wt. % of the opacifying pigment(s). The coating compositions may further contain other non-tinting filler/base pigment(s) such that the total amount of non-tinting filler/base pigment(s) is as provided above.

Other Components and Additives

It is sometimes useful to include a dispersant to adequately disperse the tinting colorants and/or the non-tinting filler/base pigments(s) in the coating compositions. The dispersant typically comprises a hydrophilic copolymer salt, a hydrophobic copolymer salt, and/or a polyacid salt. Useful dispersants are marketed under the TAMOL® trade name (Rohm and Haas Company, Pennsylvania). Hydrophilic copolymer salts such as TAMOL® 1124 are generally preferred in the latex-based compositions. Similarly, hydrophobic copolymer salts are generally preferred in the oil-based compositions.

Tripolyphosphate salts and tetrapotassium pyrophosphate can also be used to disperse the tinting colorants and/or the non-tinting filler/base pigments(s) in the coating compositions. A suitable tripolyphosphate salt is potassium tripolyphosphate (Innophos, N.J.).

The coating compositions may optionally contain other additives including but not limited to biocides, fungicides, humectants, and other suitable additives as long as the added component(s) will not adversely affect the tinting colorant instability. In other words, multi-color decorative effects should be discernible in final coating compositions when these additives are included.

It is generally desirable to use a bactericide and/or a fungicide in the coating compositions. A useful fungicide is marketed under the FUNGITROL® trade name (International Specialty Products, New Jersey). Humectants including polyhydric alcohols including but not limited to glycols such as ethylene glycol, diethylene glycol (DEG), triethylene glycol, propylene glycol, tetraethylene glycol, and polyethylene glycols are preferably used in the coating compositions in order to slow the drying of the coating composition and provide a more consistent finish. Glycols also provide freeze thaw stability to the composition.

In various embodiments, the coating composition may contain from about 15 wt. % to about 55 wt. %, about 20 wt. % to about 45 wt. %, or about 25 wt. % to about 35 wt. % of water. It is generally preferred, however, to keep the solids level as high as possible.

Substrates and Application Methods

The initially solid-colored coating compositions can advantageously be applied to a substrate surface via any conventional paint application method including but not limited to brushing, rolling, and spraying. Substrates suitable for application include but are not limited to new and existing (previously erected) inorganic wallboard panels such as gypsum wallboard formulated for interior, exterior, and wet applications, veneer plaster, concrete panels, and ceiling panels. Suitable wallboard panels are available under the FIBEROCK® and SHEETROCK® trade names (United States Gypsum Company, Illinois). Of course, other substrate surfaces may also be decorated with the coating compositions of the disclosure.

As previously set forth, conventional paint application methods such as brushing, rolling, and spraying can be used to apply the coating compositions to a substrate surface. Spraying is generally preferred because it allows uniform coatings to be applied relatively quickly. Usually, the wet thickness of the coating applied by spraying is at least about 3 to about 6 mils wet film thickness ("WFT"). However, applied coatings having wet thicknesses of up to about 60 mils can be deposited on a substrate surface without runs or sags developing (in the applied coating composition) before a final coating is formed.

The coating compositions can be applied to a substrate using an airless spray gun having an atomizing tip. Such an apparatus allows a consumer to apply a fill coverage coat having a minimum wet film thickness (WFT) of about 1 mils to about 10 mils, which results in a formed coating having a dry film thickness (DFT) of about 0.5 mils to about 5 mils. Such an applied coat dries to the touch in about 30 minutes to about 60 minutes under normal drying conditions (77° F. and 50% relative humidity). Higher humidity and/or colder temperatures may require lengthier dry times. The coverage is approximately 200-400 square feet per gallon when the coating composition is applied at a WFT of about 1 mils to about 10 mils (DFT of about 0.5 mils to about 5 mils). Actual coverage can very depending on factors such as substrate surface condition, spray techniques and procedures, and coating uniformity and thickness.

Initially solid-colored coating compositions in accordance with the disclosure can be better understood in light of the following examples. However, the foregoing description and the following examples are merely illustrative, and therefore no unnecessary limitations should be understood therefrom as numerous modifications and variations are expected to occur to those skilled in the art.

EXAMPLE 1

Table 1 provides a coating composition including four tinting colorants, one of which is generally immiscible with each of the other three. In the coating composition set forth in Table 1, one tinting colorant is a non-aqueous tinting colorant and the other three tinting colorants are universal aqueous tinting colorants. The non aqueous colorant comprises at least one pigment dispersed in a carrier including a thermoplastic acrylic resin and an organic solvent. The three aqueous tinting colorants are miscible with each other. The aqueous tinting colorants comprise at least one pigment dispersed in an aqueous solution comprising a polyhydric alcohol (e.g., glycol), and are generally hydrophilic.

The quantities of raw materials shown in Table 1 were mixed in the order shown to produce an initially solid-colored decorative effect coating composition. The liquid coating composition had a tannish appearance, and was ready to use immediately after mixing. The coating composition weighed about 12.1 to about 12.2 pounds per gallon, and contained about 50 wt. % to about 55 wt. % solids. The coating composition had a viscosity of about 110-120 Krebs units.

TABLE 1

| Raw Material | Chemical Function | Weight Pounds | Percent |
| --- | --- | --- | --- |
| Water | Solvent | 369.18 | 29.72% |
| Dipropylene glycol | Cosolvent | 33.39 | 2.69% |
| Potassium Tripolyphosphate | Dispersant | 0.46 | 0.04% |
| Caustic Soda | pH adjuster | 0.46 | 0.04% |
| TAMOL ® 1124 | Surfactant/Dispersant | 2.78 | 0.22% |
| TRITON ™ X-45 | Wetting Agent | 2.78 | 0.22% |
| METHOCEL ® J75MSN | Cellulosic thickener | 3.25 | 0.26% |
| RM-12W (Rohm and Haas Company, PA) | Associative thickener | 25.97 | 2.09% |
| ATTAGEL ® 40 | Gelling Clay | 1.86 | 0.15% |
| TIONA ® TR-90 | Opacifying pigment | 139.14 | 11.20% |
| DREWPLUS ® L-475 | Defoamer | 5.12 | 0.41% |
| FUNGITROL ® 159 | Biocide - Fungicide | 0.93 | 0.07% |
| TROYSAN ® 174 | Biocide - Bactericide | 0.93 | 0.07% |
| MISTRON ® ZSC | Non-tinting filler/base pigment | 83.48 | 6.72% |
| OMYACARB ® 6PT | Non-tinting filler/base pigment | 231.90 | 18.67% |
| MINEX ® 7 | Non-tinting filler/base pigment | 46.38 | 3.73% |
| Mica P-80F | Non-tinting filler/base pigment | 60.29 | 4.85% |
| HUBER ® 70-C | Non-tinting filler/base pigment | 1.86 | 0.15% |
| ASP ®-400 | Non-tinting filler/base pigment | 1.86 | 0.15% |
| M-60 | Non-tinting filler/base pigment | 1.86 | 0.15% |
| VINREZ ® HP-31 496 | Binder | 193.87 | 15.61% |
| COLORTREND ® 888-1810 C (Yellow Oxide) | Tinting colorant | 2.3 | 0.19% |
| COLORTREND ® 888-1572 B (Brown Oxide) | Tinting colorant | 2 | 0.16% |
| COLORTREND ® 888-2009 L (Raw Umber) | Tinting colorant | 10 | 0.81% |
| CHROMA-CHEM ® 844-2075 (Raw Umber) | Tinting colorant | 20 | 1.61% |
| TOTAL | | 1,239.57 | 100.00% |

EXAMPLE 2

Table 2 provides a coating composition including five tinting colorants, two of which are miscible with one another, but generally immiscible with each of the other three. In the coating composition set forth in Table 2, two tinting colorants are generally hydrophobic, non-aqueous tinting colorants, which are miscible with one another. The hydrophobic tinting colorants comprise a pigment dispersed in a hydroxyl functionalized unsaturated polyester resin carrier, which can be advantageously formulated to be 100 wt. % solids.

The other three tinting colorants are universal aqueous tinting colorants, which are miscible and/or partially miscible with one another (but not with the other two tinting colorants). The aqueous tinting colorants comprise at least one pigment dispersed in an aqueous solution comprising a polyhydric alcohol, and are generally hydrophilic.

The quantities of raw materials shown in Table 2 were mixed in the order shown to produce an initially solid-colored decorative effect coating composition. The liquid coating composition had a reddish tan appearance, and was ready to use immediately after mixing. The coating composition weighed about 12.1 to about 12.2 pounds per gallon, and contained about 50 wt. % to about 55 wt. % solids. The coating composition had a viscosity of about 110-120 Krebs units.

Using an airless spray gun having an atomizing tip, a coat having a wet film thickness (WFT) of about 3 mils was applied to a primed, joint treated gypsum panel substrate. Within about one minute to about five minutes after application, shear was applied (with a putty knife) to a portion of the still-forming coating such that a second portion did not experience any shear. The total color difference (ΔE) between the first portion and the second portion was determined to be about 7.7 using a ColorQuest® 45/0 LAV spectrophotometer (HunterLab, Virginia).

TABLE 2

| Raw Material | Chemical Function | Weight Pounds | Percent |
| --- | --- | --- | --- |
| Water | Solvent | 370.14 | 29.19% |
| Dipropylene glycol | Cosolvent | 33.48 | 2.64% |
| Potassium Tripolyphosphate | Dispersant | 0.47 | 0.04% |
| Caustic Soda | pH adjuster | 0.47 | 0.04% |
| TAMOL ® 1124 | Surfactant/Dispersant | 2.79 | 0.22% |
| TRITON ™ X-45 | Wetting Agent | 2.79 | 0.22% |
| METHOCEL ® J75MSN | Cellulosic thickener | 3.26 | 0.26% |
| RM-12W (Rohm and Haas Company, PA) | Associative thickener | 26.04 | 2.05% |
| ATTAGEL ® 40 | Gelling Clay | 1.86 | 0.15% |
| TIONA ® TR-90 | Opacifying pigment | 139.50 | 11.00% |
| DREWPLUS ® L-475 | Defoamer | 5.13 | 0.40% |
| FUNGITROL ® 159 | Biocide - Fungicide | 0.93 | 0.07% |
| TROYSAN ® 174 | Biocide - Bactericide | 0.93 | 0.07% |
| MISTRON ® ZSC | Non-tinting filler/base pigment | 83.70 | 6.60% |
| OMYACARB ® 6PT | Non-tinting filler/base pigment | 232.50 | 18.33% |
| MINEX ® 7 | Non-tinting filler/base pigment | 46.50 | 3.67% |
| Mica P-80F | Non-tinting filler/base pigment | 60.45 | 4.77% |
| HUBER ® 70-C | Non-tinting filler/base pigment | 1.86 | 0.15% |
| ASP ®-400 | Non-tinting filler/base pigment | 1.86 | 0.15% |
| M-60 | Non-tinting filler/base pigment | 1.86 | 0.15% |
| VINREZ ® HP-31 496 | Binder | 194.37 | 15.33% |
| COLORTREND ® 888-1810 C (Yellow Oxide) | Tinting colorant | 14.00 | 1.10% |
| COLORTREND ® 888-1572 B (Brown Oxide) | Tinting colorant | 4.30 | 0.34% |
| COLORTREND ® 888-2009 L (Raw Umber) | Tinting colorant | 2.00 | 0.16% |
| POLYTREND ® 850-1840 (Raw Umber) | Tinting colorant | 30.00 | 2.37% |
| POLYTREND ® 850-1040 (Red Iron Oxide) | Tinting colorant | 7.00 | 0.55% |
| TOTAL | | 1,268.18 | 100.00% |

EXAMPLE 3

Table 3 provides a coating composition including five tinting colorants, two of which are miscible with one another, but generally immiscible with each of the other three. In the coating composition set forth in Table 3, two tinting colorants are generally hydrophobic, non-aqueous tinting colorants, which are miscible with one another. The hydrophobic tinting colorants comprise a pigment dispersed in a hydroxyl functionalized unsaturated polyester resin carrier, which can be advantageously formulated to be 100 wt. % solids.

The other three tinting colorants are universal aqueous tinting colorants, which are miscible and/or partially miscible with one another (but not with the other two tinting colorants). The aqueous tinting colorants comprise at least one pigment dispersed in an aqueous solution comprising a polyhydric alcohol, and are generally hydrophilic.

The quantities of raw materials shown in Table 3 were mixed in the order shown to produce an initially solid-colored decorative effect coating composition. The liquid coating composition had a reddish tan appearance, and was ready to use immediately after mixing. The coating composition weighed about 12.1 to about 12.2 pounds per gallon, and contained about 50 wt. % to about 55 wt. % solids. The coating composition had a viscosity of about 110-120 Krebs units.

Using an airless spray gun having an atomizing tip, a coat having a wet film thickness (WFT) of about 3 mils was applied to a primed, joint treated gypsum panel substrate. Within about one minute to about five minutes after application, shear was applied (with a putty knife) to a portion of the still-forming coating such that a second portion did not experience any shear. The total color difference ($\Delta E$) between the first portion and the second portion was determined to be about 2.8 using a ColorQuest® 45/0 LAV spectrophotometer.

TABLE 3

| Raw Material | Chemical Function | Weight Pounds | Percent |
| --- | --- | --- | --- |
| Water | Solvent | 369.34 | 26.48% |
| Dipropylene glycol | Cosolvent | 33.41 | 2.39% |
| Potassium Tripolyphosphate | Dispersant | 0.46 | 0.03% |
| Caustic Soda | pH adjuster | 0.46 | 0.03% |
| TAMOL ® 1124 | Surfactant/Dispersant | 2.78 | 0.20% |
| TRITON ™ X-45 | Wetting Agent | 2.78 | 0.20% |
| METHOCEL ® J75MSN | Cellulosic thickener | 3.25 | 0.23% |
| RM-12W (Rohm and Haas Company, PA) | Associative thickener | 25.98 | 1.86% |
| ATTAGEL ® 40 | Gelling Clay | 1.86 | 0.13% |
| TIONA ® TR-90 | Opacifying pigment | 139.20 | 9.98% |
| DREWPLUS ® L-475 | Defoamer | 5.12 | 0.37% |
| FUNGITROL ® 159 | Biocide - Fungicide | 0.93 | 0.07% |
| TROYSAN ® 174 | Biocide - Bactericide | 0.93 | 0.07% |
| MISTRON ® ZSC | Non-tinting filler/base pigment | 83.52 | 5.99% |
| OMYACARB ® 6PT | Non-tinting filler/base pigment | 232.00 | 16.63% |
| MINEX ® 7 | Non-tinting filler/base pigment | 46.40 | 3.33% |
| Mica P-80F | Non-tinting filler/base pigment | 60.32 | 4.32% |
| HUBER ® 70-C | Non-tinting filler/base pigment | 1.86 | 0.13% |
| ASP ®-400 | Non-tinting filler/base pigment | 1.86 | 0.13% |
| M-60 | Non-tinting filler/base pigment | 1.86 | 0.13% |
| VINREZ ® HP-31 496 | Binder | 193.95 | 13.90% |
| COLORTREND ® 888-1810 C (Yellow Oxide) | Tinting Colorant | 54.00 | 3.87% |
| COLORTREND ® 888-0836 R (Exterior Red) | Tinting Colorant | 36.00 | 2.58% |
| COLORTREND ® 888-0422 L (Magenta) | Tinting Colorant | 16.00 | 1.15% |
| POLYTREND ® 850-9440 (Quinacridone) | Tinting Colorant | 80.00 | 5.73% |
| POLYTREND ® 850-9902 (Lamp Black) | Tinting Colorant | 0.73 | 0.05% |
| TOTAL | | 1,395.01 | 100.00% |

EXAMPLE 4

Table 4 provides a coating composition including a single tinting colorant. In the coating composition set forth in Table 4, the tinting colorant is a hydrophobic tinting colorant comprising a pigment dispersed in a hydroxyl functionalized unsaturated polyester resin carrier. The hydrophobic colorant is 100 wt. % solids.

The quantities of raw materials shown in Table 4 were mixed in the order shown to produce an initially solid-colored decorative effect coating composition. The liquid coating composition had a blue appearance, and was ready to use immediately after mixing. The coating composition weighed about 12.1 to about 12.2 pounds per gallon, and contained about 50 wt. % to about 55 wt. % solids. The coating composition had a viscosity of about 110-120 Krebs units.

Using an airless spray gun having an atomizing tip, a coat having a wet film thickness (WFT) of about 3 mils was applied to a primed, joint treated gypsum panel substrate. Within about one minute to about five minutes after application, shear was applied (with a putty knife) to a portion of the still-forming coating such that a second portion did not experience any shear. The total color difference ($\Delta E$) between the first portion and the second portion was determined to be about 11.2 using a ColorQuest® 45/0 LAV spectrophotometer.

TABLE 4

| Raw Material | Chemical Function | Weight Pounds | Percent |
| --- | --- | --- | --- |
| Water | Solvent | 369.34 | 30.07% |
| Dipropylene glycol | Cosolvent | 33.41 | 2.72% |
| Potassium Tripolyphosphate | Dispersant | 0.46 | 0.04% |
| Caustic Soda | pH adjuster | 0.46 | 0.04% |
| TAMOL ® 1124 | Surfactant/Dispersant | 2.78 | 0.23% |
| TRITON ™ X-45 | Wetting Agent | 2.78 | 0.23% |
| METHOCEL ® J75MSN | Cellulosic thickener | 3.25 | 0.26% |
| RM-12W (Rohm and Haas Company, PA) | Associative thickener | 25.98 | 2.12% |
| ATTAGEL ® 40 | Gelling Clay | 1.86 | 0.15% |
| TIONA ® TR-90 | Opacifying pigment | 139.20 | 11.33% |
| DREWPLUS ® L-475 | Defoamer | 5.12 | 0.42% |
| FUNGITROL ® 159 | Biocide - Fungicide | 0.93 | 0.08% |
| TROYSAN ® 174 | Biocide - Bactericide | 0.93 | 0.08% |
| MISTRON ® ZSC | Non-tinting filler/base pigment | 83.52 | 6.80% |

TABLE 4-continued

| Raw Material | Chemical Function | Weight Pounds | Percent |
|---|---|---|---|
| OMYACARB ® 6PT | Non-tinting filler/base pigment | 232.00 | 18.89% |
| MINEX ® 7 | Non-tinting filler/base pigment | 46.40 | 3.78% |
| Mica P-80F | Non-tinting filler/base pigment | 60.32 | 4.91% |
| HUBER ® 70-C | Non-tinting filler/base pigment | 1.86 | 0.15% |
| ASP ®-400 | Non-tinting filler/base pigment | 1.86 | 0.15% |
| M-60 | Non-tinting filler/base pigment | 1.86 | 0.15% |
| VINREZ ® HP-31 496 | Binder | 193.95 | 15.79% |
| POLYTREND ® 850-7240 (Phthalocyanine Blue RS) | Tinting colorant | 20.00 | 1.63% |
| TOTAL | | 1228.2746 | 100.00% |

EXAMPLE 5

Table 5 provides a coating composition including two tinting colorants, which are generally immiscible with one another. In the coating composition set forth in Table 2, one tinting colorant is a generally hydrophobic, non-aqueous tinting colorant. The hydrophobic tinting colorant comprises a pigment dispersed in a hydroxyl functionalized unsaturated polyester resin carrier, which can be advantageously formulated to be 100 wt. % solids.

The other colorant is an universal aqueous tinting colorant. The aqueous tinting colorant comprises at least one pigment dispersed in an aqueous solution comprising a polyhydric alcohol, and is generally hydrophilic.

The quantities of raw materials shown in Table 5 were mixed in the order shown to produce an initially solid-colored decorative effect coating composition. The liquid coating composition had a light blue appearance, and was ready to use immediately after mixing. The coating composition weighed about 12.1 to about 12.2 pounds per gallon, and contained about 50 wt. % to about 55 wt. % solids. The coating composition had a viscosity of about 110-120 Krebs units.

Using an airless spray gun having an atomizing tip, a coat having a wet film thickness (WFT) of about 3 mils was applied to a primed, joint treated gypsum panel substrate. Within about one minute to about five minutes after application, shear was applied (with a putty knife) to a portion of the still-forming coating such that a second portion did not experience any shear. The total color difference (ΔE) between the first portion and the second portion was determined to be about 9.3 using a ColorQuest® 45/0 LAV spectrophotometer.

TABLE 5

| Raw Material | Chemical Function | Weight Pounds | Percent |
|---|---|---|---|
| Water | Solvent | 369.34 | 26.48% |
| Dipropylene glycol | Cosolvent | 33.41 | 2.39% |
| Potassium Tripolyphosphate | Dispersant | 0.46 | 0.03% |
| Caustic Soda | pH adjuster | 0.46 | 0.03% |
| TAMOL ® 1124 | Surfactant/Dispersant | 2.78 | 0.20% |
| TRITON ™ X-45 | Wetting Agent | 2.78 | 0.20% |
| METHOCEL ® J75MSN | Cellulosic thickener | 3.25 | 0.23% |
| RM-12W (Rohm and Haas Company, PA) | Associative thickener | 25.98 | 1.86% |
| ATTAGEL ® 40 | Gelling Clay | 1.86 | 0.13% |
| TIONA ®TR-90 | Opacifying pigment | 139.20 | 9.98% |
| DREWPLUS ® L-475 | Defoamer | 5.12 | 0.37% |
| FUNGITROL ® 159 | Biocide - Fungicide | 0.93 | 0.07% |
| TROYSAN ® 174 | Biocide - Bactericide | 0.93 | 0.07% |
| MISTRON ® ZSC | Non-tinting filler/base pigment | 83.52 | 5.99% |
| OMYACARB ® 6PT | Non-tinting filler/base pigment | 232.00 | 16.63% |
| MINEX ® 7 | Non-tinting filler/base pigment | 46.40 | 3.33% |
| Mica P-80F | Non-tinting filler/base pigment | 60.32 | 4.32% |
| HUBER ® 70-C | Non-tinting filler/base pigment | 1.86 | 0.13% |
| ASP ®-400 | Non-tinting filler/base pigment | 1.86 | 0.13% |
| M-60 | Non-tinting filler/base pigment | 1.86 | 0.13% |
| VINREZ ® HP-31 496 | Binder | 193.95 | 13.90% |
| COLORTREND ® 888-7214E (Yellow Oxide) | Tinting Colorant | 54.00 | 3.87% |
| POLYTREND ® 850-7240 RS (Phthallocyanine Blue) | Tinting Colorant | 20.00 | 1.63% |
| TOTAL | | 1395.01 | 100.00% |

The foregoing description has been given for clearness of understanding only, and thus no unnecessary limitations should be understood therefrom, as modifications within the scope of the invention are expected to occur to those having ordinary skill in the art.

What is claimed is:

1. An initially solid-colored coating composition, comprising:
   a first tinting colorant,
   a thickener;
   a surfactant or a surfactant blend having a hydrophilic/lipophilic balance (HLB) value less than about 7; and,
   a binder, each of which is dispersed or dissolved in a liquid,
   wherein, after a film of the initially solid-colored coating composition is applied to a substrate surface, a multi-colored or multi-shaded decorative effect is produced during drying of the film so as to provide a final coating having two differently colored areas which exhibit a color change value (ΔE) relative to one another of greater than about 0.25,
   wherein the first tinting colorant is a hydrophobic tinting colorant and the liquid comprises an aqueous solution,
   wherein the surfactant or the surfactant blend is present in an amount of about 0.1 wt. % to about 1 wt. %, and
   wherein the amounts of the surfactant or the surfactant blend, any dispersant(s), and any wetting agent(s) included in the coating composition are not sufficient to maintain compatibility between the first tinting colorant and the other components of the coating composition after the film of the initially solid-colored coating composition is applied to the substrate surface.

2. The initially solid-colored coating composition according to claim 1, wherein the first tinting colorant is both hydrophobic and non-aqueous.

3. The initially solid-colored coating composition according to claim 1, further comprising a second tinting colorant.

4. The initially solid-colored coating composition according to claim 3, wherein the second tinting colorant has a physical property which is different relative to the first tinting colorant such that the first and second tinting colorants are substantially immiscible with one another.

5. The initially solid-colored coating composition according to claim 1, wherein the thickener comprises a cellulosic thickener and an associative thickener.

6. The initially solid-colored coating composition according to claim 5, wherein the cellulosic thickener is present in an amount of about 0.01 wt. % to about 5 wt. %, and the associative thickener is present in an amount of about 0.01 wt. % to about 10 wt. %.

7. The initially solid-colored coating composition according to claim 6, further comprising a basic material in an amount of about 0.001 wt. % to about 5 wt. %.

8. The initially solid-colored coating composition according to claim 1, wherein the surfactant or surfactant blend comprises moieties which are substantially non-ionic in character.

9. The initially solid-colored coating composition according to claim 8, wherein the surfactant or surfactant blend comprises a surfactant selected from the group consisting of octylphenol ethoxylates, nonylphenol ethoxylates, and mixtures thereof.

10. The initially solid-colored coating composition according to claim 1, further comprising a dispersant having a HLB value, and the combination of the surfactant or surfactant blend and the dispersant has a HLB value below about 9.

11. The initially solid-colored coating composition according to claim 1, wherein the binder is selected from the group consisting of latex emulsion media.

12. The initially solid-colored coating composition according to claim 1, wherein the binder is present in an amount of about 1 wt. % to about 40 wt. %.

13. The initially solid-colored coating composition according to claim 1, further comprising at least one non-tinting filler/base pigment.

14. The initially solid-colored coating composition according to claim 13, wherein the non-tinting filler/base pigment is present in an amount of about 1 wt. % to about 45 wt. %.

15. The initially solid-colored coating composition according to claim 14, wherein the non-tinting filler/base pigment comprises an opacifying pigment.

16. The initially solid-colored coating composition according to claim 1, wherein the multi-colored or multi-shaded decorative effect is produced by application of shear to the film while the coating composition is still in a liquid and/or quasi-liquid state.

17. An initially solid-colored paint composition, comprising:
a thickener;
a surfactant or a surfactant blend having a hydrophilic/lipophilic balance value less than about 7;
a first tinting colorant; and,
a second tinting colorant, each of which is dispersed or dissolved in a liquid,
wherein the first and second tinting colorants are initially compatible with the initially solid-colored paint composition, and wherein, after a film of the initially solid-colored paint composition is applied to a substrate surface, at least one tinting colorant becomes incompatible with the paint composition while the paint composition is still in a liquid and/or quasi-liquid state to create a final coating exhibiting a desired multi-colored and/or multi-shaded decorative effect,
wherein the at least one tinting colorant is a hydrophobic tinting colorant and the liquid comprises an aqueous solution,
wherein the surfactant or the surfactant blend is present in an amount of about 0.1 wt. % to about 1 wt. %, and
wherein the amounts of the surfactant or the surfactant blend, any dispersant(s), and any wetting agent(s) included in the paint composition are not sufficient to maintain compatibility between the at least one tinting colorant and the other components of the paint composition after the film of the initially solid-colored paint composition is applied to the substrate surface.

18. An initially solid-colored paint composition, comprising:
a first tinting colorant;
a thickener;
a surfactant or a surfactant blend having a hydrophilic/lipophilic balance value less than about 7 in an amount sufficient to permit micelle formation in a liquid form of the paint composition, but not sufficient to provide full color development to the paint composition; and,
a binder, each of which is dissolved or dispersed in a liquid,
wherein, after a film of the initially solid-colored paint composition is applied to a substrate surface, a multi-colored or multi-shaded decorative effect is produced during drying of the film,
wherein the first tinting colorant is a hydrophobic tinting colorant and the liquid comprises an aqueous solution,
wherein the surfactant or the surfactant blend is present in an amount of about 0.1 wt. % to about 1 wt. %, and
wherein the amounts of the surfactant or the surfactant blend, any dispersant(s), and any wetting agent(s) included in the paint composition are not sufficient to maintain compatibility between the first tinting colorant and the other components of the paint composition after the film of the initially solid-colored coating composition is applied to the substrate surface.

19. A paint container, comprising:
an initially solid-colored coating composition according to claim 1; and,
a label indicating that shear should be applied to portions of an applied film of the coating composition while the coating composition is still in a liquid state so as to provide a final coating having two differently colored areas which exhibit a color change value ($\Delta E$) relative to one another of greater than about 0.25.

20. A method of decorating a substrate surface, comprising:
loading a painting implement with an initially solid-colored paint composition according to claim 2; and,
applying a film of the paint to a substrate surface, wherein, after the film is applied, the first tinting colorant becomes incompatible with the initially solid-colored paint composition such that a portion of the first tinting colorant migrates to an exterior facing surface of the film while the initially solid-colored paint composition is still in a liquid state so as to provide a final coating having two differently colored areas which exhibit a color change value ($\Delta E$) relative to one another of greater than about 0.25.

21. The method of decorating a substrate surface according to claim 20, further comprising applying shear to the film before the initially solid-colored paint composition has completely dried.

* * * * *